US009720673B2

(12) United States Patent
Deng et al.

(10) Patent No.: US 9,720,673 B2
(45) Date of Patent: *Aug. 1, 2017

(54) SYSTEM, METHOD, AND COMPUTER PROGRAM PRODUCT FOR COLLABORATIVELY INSTALLING A COMPUTER APPLICATION

(71) Applicant: International Business Machines Corporation, Armonk, NY (US)

(72) Inventors: Yuan Yao Deng, Beijing (CN); Xin Pei Lang, Beijing (CN); Dou Ma, Beijing (CN); Jin Liang Shi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/937,708

(22) Filed: Nov. 10, 2015

(65) Prior Publication Data
US 2016/0077821 A1 Mar. 17, 2016

Related U.S. Application Data

(63) Continuation of application No. 13/049,034, filed on Mar. 16, 2011, now Pat. No. 9,218,173.

(30) Foreign Application Priority Data

Apr. 30, 2010 (CN) .......................... 2010 1 0163231

(51) Int. Cl.
*G06F 9/445* (2006.01)
(52) U.S. Cl.
CPC ...................... *G06F 8/61* (2013.01)
(58) Field of Classification Search
CPC ....................................... G06F 9/445
(Continued)

(56) References Cited

U.S. PATENT DOCUMENTS 5,138,712 A * 8/1992 Corbin ................. G06F 21/105
705/59
6,513,013 B1 1/2003 Stephanou
(Continued)

FOREIGN PATENT DOCUMENTS

CN 1726463 A 1/2006

OTHER PUBLICATIONS

Muir ("How to connect to Remote Assistance in Windows 7") from "Windows 7 Just thge Steps for Dummioes", Sep. 2009.*
(Continued)

*Primary Examiner* — Jae Jeon
(74) *Attorney, Agent, or Firm* — Zilka-Kotab, P.C.

(57) ABSTRACT

In one embodiment, a method for collaboratively installing a computer application includes monitoring an installation process of an application. The method also includes determining that the installation process requires remote assistance in order to continue. Also, the method includes sending a remote assistance request to remote assistance personnel at a remote site in response to the determination that the installation process requires remote assistance in order to continue. Moreover, the method includes receiving a response to the remote assistance request. The response includes remote assistance information required for installing the application provided by the remote assistance personnel at the remote site. Also, the remote assistance information and the response to the remote assistance request are invisible to an installer of the application. In addition, the method includes continuing the installation process of the application using the remote assistance information received from the remote assistance personnel at the remote site.

14 Claims, 5 Drawing Sheets

(58) Field of Classification Search
USPC .................. 717/174, 175, 176, 178, 177
See application file for complete search history.

(56) References Cited

U.S. PATENT DOCUMENTS

| | | | |
|---|---|---|---|
| 6,658,466 | B1 | 12/2003 | Ellestad et al. |
| 6,966,060 | B1 | 11/2005 | Young et al. |
| 7,051,211 | B1 | 5/2006 | Matyas, Jr. et al. |
| 7,539,733 | B2 | 5/2009 | Mohammed et al. |
| 9,218,173 | B2 | 12/2015 | Deng et al. |
| 2001/0044839 | A1 | 11/2001 | Bourke-Dunphy et al. |
| 2003/0065731 | A1* | 4/2003 | Mohammed ............. G06F 21/33 709/208 |
| 2003/0101287 | A1 | 5/2003 | Novik et al. |
| 2005/0005137 | A1 | 1/2005 | Benedikt |
| 2005/0177823 | A1* | 8/2005 | Miyake .................... G06F 21/10 717/159 |
| 2005/0204353 | A1 | 9/2005 | Ji |
| 2005/0209871 | A1* | 9/2005 | Han ....................... G06F 9/4411 717/168 |
| 2005/0257214 | A1* | 11/2005 | Moshir ....................... G06F 8/62 717/171 |
| 2006/0075001 | A1 | 4/2006 | Canning et al. |
| 2006/0248699 | A1 | 11/2006 | Sievenpiper et al. |
| 2006/0277536 | A1 | 12/2006 | Stein et al. |
| 2007/0043679 | A1* | 2/2007 | Le ............................ G06F 21/10 705/59 |
| 2007/0100762 | A1 | 5/2007 | Luo et al. |
| 2007/0156851 | A1 | 7/2007 | Tasci |
| 2008/0301669 | A1* | 12/2008 | Rao ............................ G06F 8/65 717/173 |
| 2008/0301672 | A1 | 12/2008 | Rao et al. |
| 2008/0307413 | A1 | 12/2008 | Ferris et al. |
| 2009/0234478 | A1 | 9/2009 | Muto et al. |
| 2010/0257580 | A1* | 10/2010 | Zhao ................... H04L 12/2602 726/1 |
| 2011/0271274 | A1 | 11/2011 | Deng et al. |

OTHER PUBLICATIONS

Deng et al., U.S. Appl. No. 13/049,034, filed Mar. 16, 2011.
Non-Final Office Action from U.S. Appl. No. 13/049,034, dated Dec. 13, 2012.
Non-Final Office Action from U.S. Appl. No. 13/049,034, dated Apr. 11, 2013.
Final Office Action from U.S. Appl. No. 13/049,034, dated Aug. 13, 2013.
Non-Final Office Action from U.S. Appl. No. 13/049,034, dated Jun. 4, 2014.
Final Office Action from U.S. Appl. No. 13/049,034, dated Jan. 2, 2015.
Advisory Action from U.S. Appl. No. 13/049,034, dated Apr. 15, 2015.
Notice of Allowance from U.S. Appl. No. 13/049,034, dated Aug. 12, 2015.
Muir, N., "How to Connect to Remote Assistance in Windows 7," Windows 7 Just the Steps for Dummies, Dummies.com, Sep. 2009, 4 pages, retrieved from http://www.dummies.com/how-to/content/how-to-connect-to-remote-assistance-in-windows-7.html.
Fotakeus, A., "Let Users Install Software Without Giving Them Administrator Rights," Windows IT Pro, Jul. 2006, 2 pages, retrieved from http://windowsitpro.com/systems-management/let-users-install-software-without-giving-them-administrator-rights.
Chinese Office Action from Application No. 201010163231.6, dated Mar. 25, 2013.

* cited by examiner

SYSTEM, METHOD, AND COMPUTER PROGRAM PRODUCT FOR COLLABORATIVELY INSTALLING A COMPUTER APPLICATION

BACKGROUND

The present invention relates to data processing, and more particularly, this invention relates to collaboratively installing a computer application.

With recent developments in computer technology, computer applications have gradually evolved toward large enterprise-level applications. Since a large enterprise-level application often includes many complicated components, logic, and/or modules, support and cooperation from multiple parties are generally required when deploying a large enterprise-level application, that is, collaboration is required to complete the deployment of the application. For example, authentication information for the system, database, application server, business domain application, IT infrastructure, and the like, may be required. Usually, such information is confidential, such as user group information, permission information, role information, access control information, and the like. Generally, they are distributed across and kept by different personnel, such as a system administrator, a database administrator, an application server administrator, a business domain application administrator, an IT infrastructure administrator, etc. If such confidential information is provided to a person that deploys the application, it may bring with it numerable security risks. Further, at many times, a system administrator, a database administrator, an application server administrator, a business domain application administrator, an IT infrastructure administrator, etc., may often be located at different geographical locations and/or may work in different time zones, thereby bringing difficulties in the deployment of large enterprise-level applications.

SUMMARY

According to one embodiment, a computer program product for collaboratively installing a computer application includes a non-transitory computer readable storage medium having program instructions embodied therewith. The embodied program instructions are readable by a processor to cause the processor to monitor, by the processor, an installation process of an application and detect when an installer of the application encounters problems during the installation process. The installation process is started prior to the monitoring starting. Also, the embodied program instructions are readable to cause the processor to determine, by the processor, that remote assistance is required in order for the installation process to continue. In addition, the embodied program instructions are readable to cause the processor to send, by the processor, a remote assistance request to remote assistance personnel at a remote site in response to the determination that the installation process requires remote assistance in order to continue. Moreover, the embodied program instructions are readable to cause the processor to receive, by the processor, a response to the remote assistance request. The response includes remote assistance information required for installing the application provided by the remote assistance personnel at the remote site. Also, the remote assistance information and the response to the remote assistance request are invisible to the installer of the application. The embodied program instructions are also readable to cause the processor to continue, by the processor, the installation process of the application using the remote assistance information received from the remote assistance personnel at the remote site.

In another embodiment, a system for collaboratively installing a computer application includes a hardware processor and modules integrated with and/or executable by the hardware processor. The modules include a monitoring module configured to monitor an installation process of an application initiated by an installer at an installation site. The modules also include a determining module configured to determine that remote assistance is required in order for the installation process to continue. In addition, the modules include a sending module configured to send a remote assistance request to remote assistance personnel at a remote site in response to the determination that the installation process requires remote assistance in order to continue. Also, the modules include a receiving module configured to receive a response to the remote assistance request. The response includes remote assistance information required for installing the application provided by the remote assistance personnel at the remote site. Also, the remote assistance information is provided by remote assistance personnel at a remote site. Additionally, the remote assistance information and the response to the remote assistance request are invisible to the installer of the application. Moreover, the remote assistance information is selected from a list consisting of: authentication information, user group information, permission information, role information, and access control information. The modules also include an installing module configured to continue the installation process of the application using the remote assistance information received from the remote assistance personnel at the remote site.

In yet another embodiment, a method for collaboratively installing a computer application includes monitoring an installation process of an application. The method also includes determining that the installation process requires remote assistance in order to continue. Also, the method includes sending a remote assistance request to remote assistance personnel at a remote site in response to the determination that the installation process requires remote assistance in order to continue. Moreover, the method includes receiving a response to the remote assistance request. The response includes remote assistance information required for installing the application provided by the remote assistance personnel at the remote site. Also, the remote assistance information and the response to the remote assistance request are invisible to an installer of the application. In addition, the method includes continuing the installation process of the application using the remote assistance information received from the remote assistance personnel at the remote site.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Several problems that are encountered during the deployment of large, enterprise-level applications are: 1) a person that deploys the application is generally required to input necessary parameters during installation of the enterprise application, thus the person that deploys the application may need to wait for one or more user interfaces of an installation program to prompt input of relevant parameters, and 2) subsequent operations may proceed only after necessary parameters have been inputted. These problems with conventional deployment of large, enterprise-level applications make it difficult to efficiently and securely deploy these types of applications.

For any of the various reasons described previously, deployment of large, enterprise-level applications is often time-consuming, tiresome, and inefficient. However, collaboratively installing a computer application using remote assistance information, when applicable, to aid in the installation process of the application, may resolve the drawbacks and problems associated with conventional installation of large, enterprise-level applications. Accordingly, embodiments of the present invention provide ways to collaboratively install an enterprise-level application by monitoring the installation for required information, gathering the required information through remote assistance, and applying the required information to continue and ultimately complete the installation.

According to one general embodiment, a computer program product for collaboratively installing a computer application includes a computer readable storage medium having computer readable program code embodied therewith, the computer readable program code including computer readable program code configured to: monitor an installation process of an application, send a remote assistance request in response to a determination that the installation process requires remote assistance, receive a response to the remote assistance request, and continue the installation process of the application using the remote assistance information. The response includes remote assistance information required for installing the application, and the remote assistance information is invisible to an installer of the application.

In another general embodiment, a system for collaboratively installing a computer application includes a monitoring module configured to monitor an installation process of an application, a sending module configured to send a remote assistance request in response to a determination that the installation process requires remote assistance, a receiving module configured to receive a response to the remote assistance request, and an installing module configured to continue the installation process of the application using the remote assistance information. The response includes remote assistance information required for installing the application, and the remote assistance information is invisible to an installer of the application.

In yet another general embodiment, a method for collaboratively installing a computer application includes monitoring an installation process of an application, sending a remote assistance request in response to a determination that the installation process requires remote assistance, receiving a response to the remote assistance request, and continuing the installation process of the application using the remote assistance information. The response includes remote assistance information required for installing the application, and the remote assistance information is invisible to an installer of the application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. In particularly preferred approaches, the computer readable storage medium is nontransitory.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
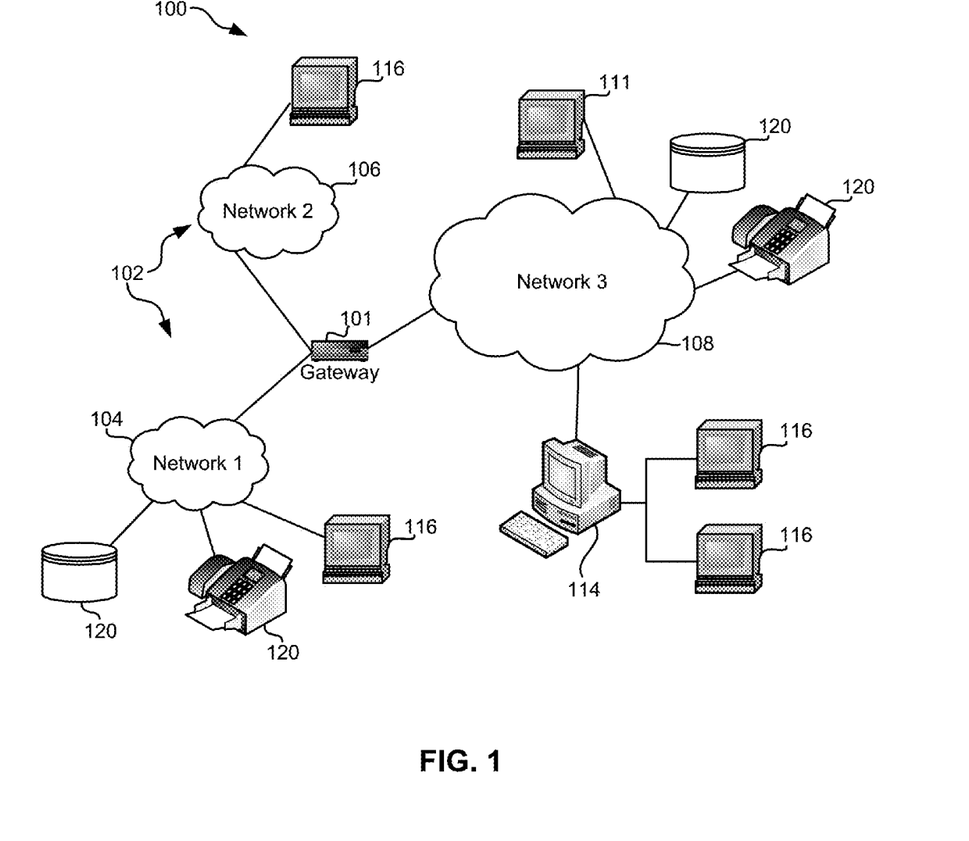
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
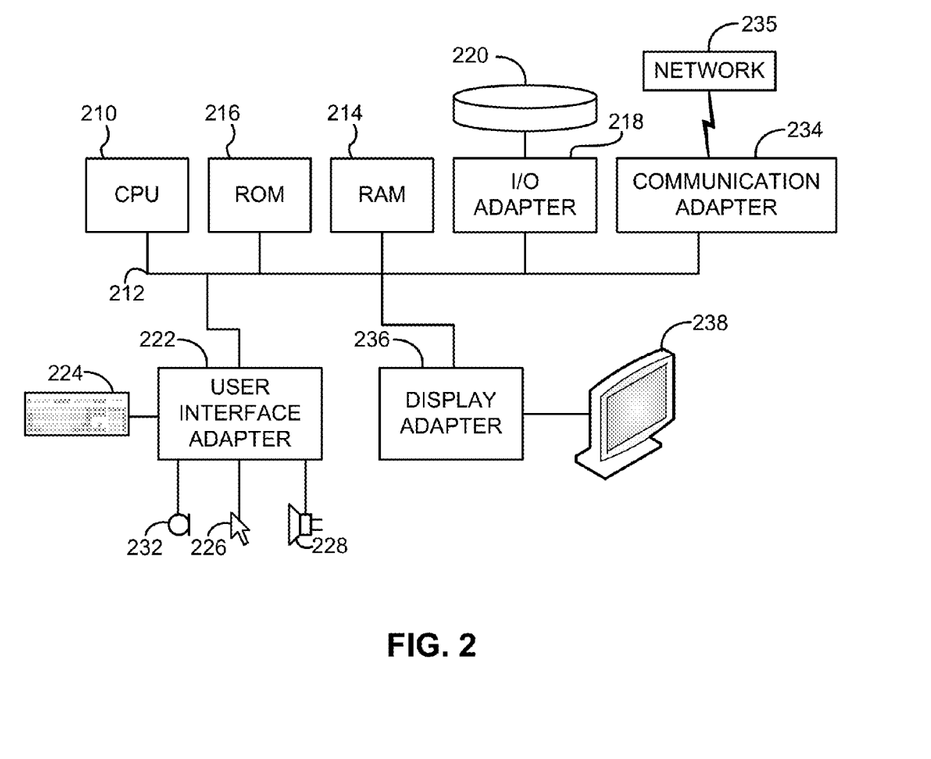
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), an IBM z/OS, a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
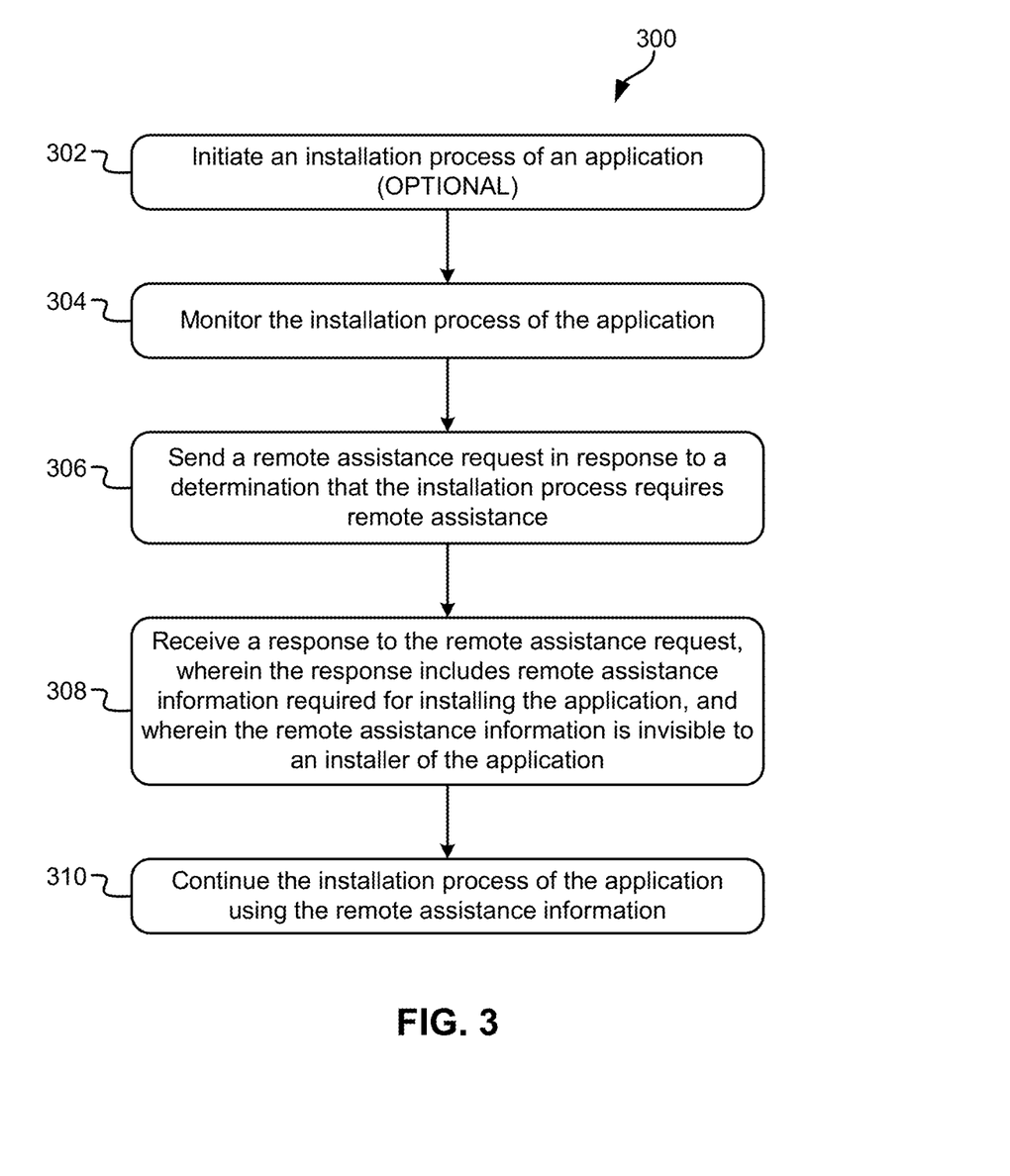
FIG. 3 shows a flowchart of a method for collaboratively installing a computer application, according to one embodiment.

Referring now to the figures, FIG. 3 shows a flowchart of a method 300 for collaboratively installing a computer application, according to one embodiment. The method 300 may be carried out in any desired environment, such as those described in FIGS. 1-2, according to some embodiments. More or less operations than those in FIG. 3 and described below may comprise method 300, according to more approaches.

In optional operation 302, an installation process is initialized. The installation process may be initialized by any entity or party, such as a user at a user facility or an administrator facility, a system at the user facility or the administrator facility, an application at the user facility or the administrator facility, etc. For example, in one embodiment, the installation process may be initialized by a user at the user facility to install a large, enterprise-level application to one or more systems at the user facility, in which case the installation process is already initialized and operation 302 is unnecessary.

In operation 304, the installation process is monitored. This monitoring may be performed by an administrator, administrative routine, or in any other manner as would be understood by one having ordinary skill in the art upon reading the present descriptions. In one embodiment, a monitoring module included in the installation process may perform the monitoring. This monitoring is intended to allow for a collaborative installation of the application, so that if, for example, the user or anyone else installing the application runs into trouble during the installation process, an entity or party monitoring the installation process, such as an administrator, can help with the installation process and have all the information necessary to do so.

In operation 306, it is determined whether remote assistance is required to continue the installation process, and a remote assistance request is sent, such as to an entity which initialized the installation process, the monitoring module, etc., in response to this determination.

According to one embodiment, when it is determined that remote assistance is required, the installation process of the application may invoke a communication module to send the remote assistance request. This communication module may be an email communication module, an instant message communication module, or any other communication module capable of communicating with remote assistance personnel as would be understood by one having ordinary skill in the art upon reading the present descriptions.

In operation 308, a response to the remote assistance request is received. In one embodiment, the response includes remote assistance information which is determined to be required for installing the application, and the remote assistance information is invisible to an installer of the application.

For example, the remote assistance request sent by the installation process may be received by the monitoring module. In response, the monitoring module may provide what is determined to be required remote assistance to the installation process. In one embodiment, providing remote assistance may include providing information not viewable, accessible, or readable by the user who initialized the installation process.

In one alternative embodiment, the remote assistance request includes a designated field for inputting remote assistance information, which may also be used to identify remote assistance information. The communication module sends the remote assistance request to remote assistance personnel, who input the remote assistance information required for installing the application into the aforementioned designated field. The remote assistance personnel next confirm the accuracy of this information, and transmit it to the user-initialized installation process, such that the required information may be used to continue installation of the application.

In more embodiments, confidential remote assistance information may be protected by encryption via any encryption method as would be understood by one having ordinary skill in the art upon reading the present descriptions. Additionally, in this embodiment, the user(s) initializing the installation process cannot access information encrypted with the remote assistance request, thereby protecting this information from access by parties which do not have authorization to access it.

In operation 310, the installation process of the application continues using the remote assistance information, thereby continuing installation of the application. The remote assistance information may be extracted by identifying a corresponding designated field in the response which is sent in reply to the request for remote assistance.

In one embodiment, remote assistance may include: authentication information (for example, authentication for a system administrator, database administrator, application server administrator, business domain application administrator, IT infrastructure administrator, etc.), user group information, permission information, role information, access control information, etc. Additionally, in other embodiments, remote assistance may include confidential information, and therefore some embodiments may further employ encryption to preserve confidentiality, as would be understood by one having ordinary skill in the art upon reading the present descriptions.

In embodiments where the remote assistance information is transmitted in an encrypted manner, a corresponding decryption operation is performed before extracting the remote assistance information. After the remote assistance information is successfully extracted, the remote assistance information is applied to installation process of the application, and installation of the application continues.

In another embodiment, the installation process of the application may be initiated by the installer at an installation site, and the remote assistance information may be provided by remote assistance personnel at a remote site. Of course, one of skill in the art may, upon reading the present descriptions, understand that other initiators and assistance providers may be possible, according to various embodiments.

Of course, this method 300 may be implemented as logic on any device and/or system or as a computer program product, according to various embodiments.

Figure 4:
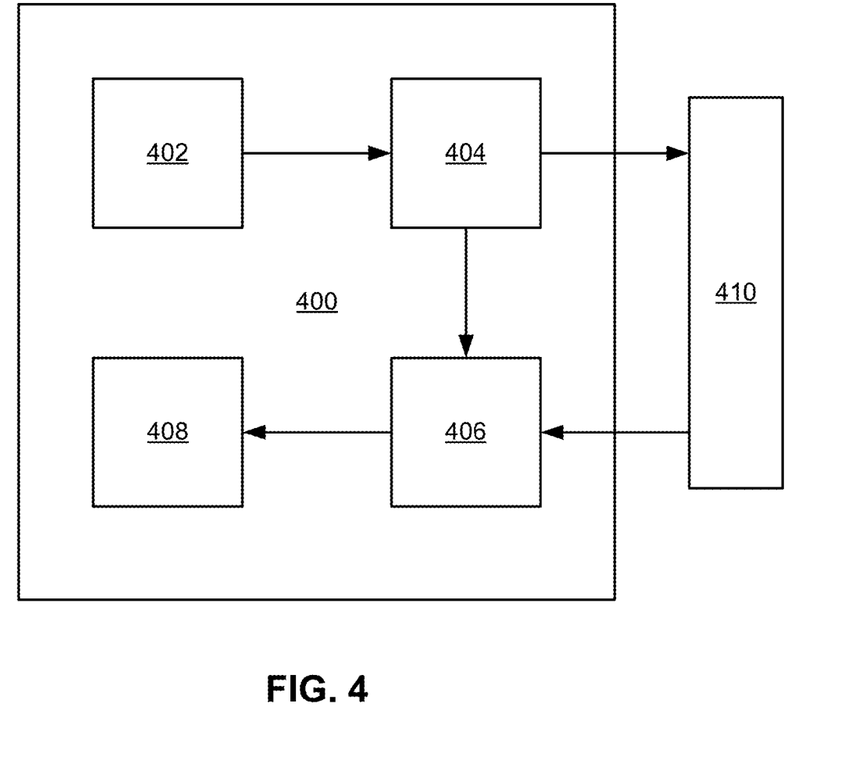
FIG. 4 shows a system for collaboratively installing a computer application, according to one embodiment.

Referring to FIG. 4, a system 400 for collaboratively installing a computer application is shown, according to one embodiment. The system 400 comprises a monitoring module 402 configured to monitor an installation process of an application, such as a large, enterprise-level application, in some embodiments, a sending module 404 configured to send a remote assistance request in response to a determination that the installation process requires remote assistance, a receiving module 406 configured to receive a response to the remote assistance request, and an installing module 408 configured to continue the installation process of the application using the remote assistance information. The response includes remote assistance information required for installing the application, and the remote assistance information is invisible to an installer of the application, in some embodiments.

In some embodiments, the sending module 404 and the receiving module 406 may communicate with another system, application, user, administrator, etc., (collectively shown as 410) in order to obtain the remote assistance information.

In several embodiments, the remote assistance information may include one or more of the following: authentication information of a system administrator, database administrator, application server administrator, business domain application administrator, IT infrastructure administrator, etc., user group information, permission information, role information, access control information, etc., any of which may be confidential, and in some embodiments, encrypted.

In one approach, receiving module 406 may be configured to receive a response to the remote assistance request, wherein the response includes remote assistance information required for installing the application and the remote assistance information is invisible and inaccessible to a user or some other entity which initialized the installation process.

According to one embodiment, where remote assistance is used by the installation process, a communication module may send the remote assistance request. The communication module may be an email communication module, an instant message communication module, or any other communication module capable of communicating with remote assistance personnel, as would be understood by one having ordinary skill in the art upon reading the present descriptions. The communication module may send the remote assistance request to remote assistance personnel, so that the remote assistance personnel, which may be located at a vendor facility or some other site, may input the remote assistance information that can be used for installing the application.

In yet another embodiment, the remote assistance request may include a designated field for inputting remote assistance information, and this designated field may be further used to identify remote assistance information. According to this embodiment, after a remote assistance request is received, remote assistance personnel may populate the designated field with the requested remote assistance information, and send the information back to the user-initialized installation process as a response.

In a preferred embodiment, messages including remote assistance information may be transmitted in encrypted form, using any encryption method as would be understood by one having ordinary skill in the art upon reading the present descriptions. Additionally, since the remote assistance information is encrypted, the user initializing the installation process or any other entity or party cannot view or access the remote assistance information.

With continuing reference to FIG. 4, an installing module 408 may be configured to continue the installation process of the application using the remote assistance information. In one exemplary approach, the remote assistance information may be identified, decrypted, and extracted by the installing module. After remote assistance information is successfully extracted, the remote assistance information may be applied to the installation process of the application, and the installation process of the application continues.

In another embodiment, the installation process of the application may be initiated by the installer at an installation site, and the remote assistance information may be provided by remote assistance personnel at a remote site. Of course, one of skill in the art may, upon reading the present descriptions, understand that other initiators and assistance providers may be possible, according to various embodiments.

Figure 5:
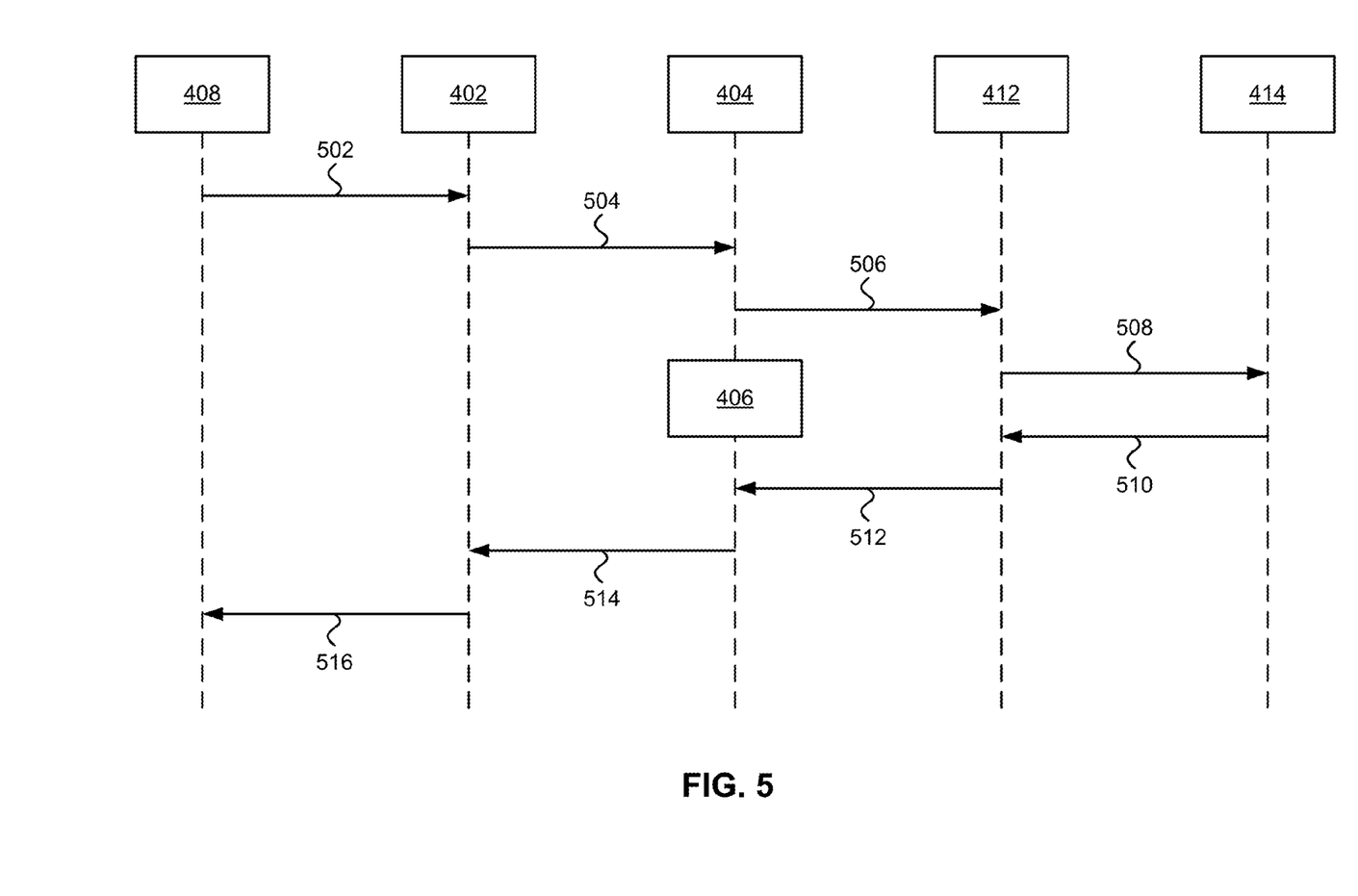
FIG. 5 illustratively shows a signal-flow process for collaboratively installing a computer application, according to one embodiment.

Referring now to FIG. 5, a method 500 for collaboratively installing a computer application is shown according to one embodiment, in the form of a signal flow. The method 500 may be carried out in any desired environment, such as those described in FIGS. 1-2, and 4 according to some embodiments. More or less operations than those in FIG. 5 and described below may comprise method 500, according to more approaches.

First, in operation 502, during installation, the installing module 408 may invoke the monitoring module 402 to monitor the installation process of the application, according to one embodiment.

Next, monitoring module 402, according to one embodiment, may monitor the installation process of the application to determine whether the installation process requires remote assistance. The remote assistance may include, according to various embodiments, one or more of the following: authentication information (for example, of a system administrator, database administrator, application server administrator, business domain application administrator, IT infrastructure administrator, etc.), user group information, permission information, role information, access control information, etc. Generally, such authentication information is confidential.

If the monitoring module 402 determines that the installation process requires remote assistance, it invokes the sending module 404, in operation 504, to send a request for remote assistance, according to one embodiment.

After the sending module 404 is invoked, the communication module 412 may be invoked to send the remote assistance request, in operation 506, according to one embodiment. The communication module 412 may be an email communication module, an instant message communication module, or any other communication module capable of communicating with remote assistance personnel, as would be understood by one having ordinary skill in the art upon reading the present descriptions.

The communication module 412 may send the remote assistance request to remote assistance personnel 414 in operation 508, according to one embodiment. The remote assistance request may include a designated field for inputting remote assistance information, and this designated field may be used to identify the remote assistance information. The communication module 412 may send the remote assistance request, including the designated field for inputting remote assistance information, to remote assistance personnel 414, who may then input remote assistance information used for installation of the application into a response.

The remote assistance personnel 414, according to one embodiment, may input the remote assistance information used for installation of the application in the designated field, and then a response may be sent to the communication module 412 as a response to the remote assistance request, in operation 510.

The communication module 412, according to one embodiment, may send the received response, including the remote assistance information, to the receiving module 406 in operation 512.

The receiving module 406, according to one embodiment, may receive the response including the remote assistance information. In one embodiment, the remote assistance information may be invisible to an installer of the application. Then, the sending module 406 sends the received response including the remote assistance information to the monitoring module 402 in operation 514.

The monitoring module 402, according to one embodiment, extracts the remote assistance information included in the response, and sends the remote assistance information to the installing module 408 in operation 516. The installing module 408 continues the installation process of the application by using the obtained remote assistance information.

The remote assistance information may be extracted by identifying a corresponding designated field in the response message to the remote assistance request, and if the response message to the remote assistance request is transmitted in encrypted form, a corresponding decryption operation may be performed prior to extracting the remote assistance information. After the remote assistance information is successfully extracted, the remote assistance information may be applied to the installation process of the application such that the installation process continues.

In another embodiment, the installation process of the application may be initiated by the installer at an installation site, and the remote assistance information may be provided by remote assistance personnel at a remote site. Of course, one of skill in the art may, upon reading the present descriptions, understand that other initiators and assistance providers may be possible, according to various embodiments.

The basic principle, according to various embodiments, has been described above in conjunction with specific embodiments; however, it should be noted that those skilled in the art can appreciate that any or all steps, operations, etc., of the methods and apparatuses described above may be implemented in any computing means (including processor, storage medium, etc.) or network of computer means in hardware, firmware, software, or a combination thereof, and that this may be achieved by those skilled in the art using basic programming skill after reading the present descriptions.

Thus, the object may also be implemented by running a program or a set of programs on any computing apparatus. The computing apparatus may be any general purpose computing machine, or any specific computing machine, as would be understood by one having ordinary skill in the art upon reading the present descriptions. Thus, the object may also be implemented by merely providing a computer program product which includes computer readable program code for implementing the methods described herein.

Further, operations for performing the above series of processes may be performed according to the described order naturally in time sequence, but not necessarily in time sequence. Some operations may be performed in parallel or independent to each other.

Although the disclosure and its advantages have been described in detail, it should be appreciated that various modifications, replacements, and/or changes may be made without departing from the spirit and scope defined by the appended claims. Further, terms "include" and "comprise" in the present application or any other variants are intended to encompass non-exclusive inclusion, such that a process, method, article of manufacture, or apparatus containing a series of elements include not only those elements, but may also include other elements not listed explicitly, or may include elements inherent to such a process, method, article of manufacture, or apparatus. Without further limitation, elements defined by the phrase "including a . . . " do not exclude other same elements that exist in the process, method, article of manufacture, or apparatus including that element.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for collaboratively installing a computer application, the computer program product comprising a non-transitory computer readable storage medium having program instructions embodied therewith, the program instructions readable by a processor to cause the processor to:
    monitor, by the processor, an installation process of an application and detect when an installer of the application encounters problems during the installation process, wherein the installation process is started prior to the monitoring starting;
    determine, by the processor, that remote assistance is required in order for the installation process to continue;
    send, by the processor, a remote assistance request to remote assistance personnel at a remote site in response to determining that the installation process requires the remote assistance in order to continue, wherein the remote assistance request includes a description of the request and authentication information;
    receive, by the processor, a response to the remote assistance request, wherein the response includes remote assistance information required for installing the application provided by the remote assistance personnel at the remote site, wherein the remote assistance information includes user group information or role information, wherein the response including the remote assistance information is encrypted, and wherein the remote assistance information and the response to the remote assistance request are invisible to the installer of the application;
    decrypt, by the processor, the remote assistance information; and continue, by the processor, the installation process of the application using the remote assistance information received from the remote assistance personnel at the remote site, wherein the remote assistance request includes a field for inputting the remote assistance information, wherein the program instructions readable to cause the processor to determine that remote assistance is required is further readable to cause the processor to determine, by the processor, that one or more parameters must be entered in order to proceed with subsequent operations of the installation process, and wherein the subsequent operations cannot proceed until the one or more parameters have been entered.

2. The computer program product as recited in claim 1, wherein the program instructions are further readable by the processor to cause the processor to:

invoke, by the processor, a communication module to send the remote assistance request.

3. The computer program product as recited in claim 1, wherein the program instructions that cause the processor to decrypt, by the processor, the response further causes the processor to extract the remote assistance information from the response after decryption thereof.

4. The computer program product as recited in claim 1, wherein the installation process of the application is configured to be initiated by the installer at an installation site.

5. The computer program product as recited in claim 1, wherein the application is an enterprise-level computer application.

6. A system for collaboratively installing a computer application, the system comprising:

a hardware processor and modules integrated with and/or executable by the hardware processor, the modules comprising:

a monitoring module configured to monitor an installation process of an application initiated by an installer at an installation site and detect when an installer of the application encounters problems during the installation process, wherein the installation process is started prior to the monitoring starting;

a determining module configured to determine that remote assistance is required in order for the installation process to continue;

a sending module configured to send a remote assistance request to remote assistance personnel at a remote site in response to determining that the installation process requires the remote assistance in order to continue, wherein the remote assistance request includes a description of the request and authentication information;

a receiving module configured to receive a response to the remote assistance request, wherein the response includes remote assistance information required for installing the application provided by the remote assistance personnel at the remote site, wherein the remote assistance information is provided by the remote assistance personnel at the remote site, wherein the remote assistance information and the response to the remote assistance request are invisible to the installer of the application, wherein the response including the remote assistance information is encrypted, and wherein the remote assistance information includes user group information or role information;

a decryption module configured to decrypt the remote assistance information; and an installing module configured to continue the installation process of the application using the remote assistance information received from the remote assistance personnel at the remote site, wherein the remote assistance request includes a field for inputting the remote assistance information, wherein the determining module is further configured to determine that one or more parameters must be entered in order to proceed with subsequent operations of the installation process, and wherein the subsequent operations cannot proceed until the one or more parameters have been entered.

7. The system as recited in claim 6, further comprising: an invoking module configured to invoke a communication module to send the remote assistance request.

8. The system as recited in claim 6, wherein the installation process of the application is performed by the installer at the installation site.

9. The system as recited in claim 6, wherein the application is an enterprise-level computer application.

10. The system as recited in claim 6, wherein the decryption module is further configured to extract the remote assistance information from the response after decryption thereof.

11. A computer-implemented method for collaboratively installing a computer application, the method comprising:

monitoring an installation process of an application and detecting when an installer of the application encounters problems during the installation process, wherein the installation process is started prior to the monitoring starting;

determining that the installation process requires remote assistance in order for the installation process to continue;

sending a remote assistance request to remote assistance personnel at a remote site in response to determining that the installation process requires the remote assistance in order to continue, wherein the remote assistance request includes a description of the request and authentication information;

receiving a response to the remote assistance request, wherein the response includes remote assistance information required for installing the application provided by the remote assistance personnel at the remote site, wherein the remote assistance information includes user group information or role information, wherein the response including the remote assistance information is encrypted, and wherein the remote assistance information and the response to the remote assistance request are invisible to an installer of the application;

decrypting the remote assistance information; and continuing the installation process of the application using the remote assistance information received from the remote assistance personnel at the remote site, wherein the remote assistance request includes a field for inputting the remote assistance information, wherein the determining that the installation process requires remote assistance in order to continue comprises determining that one or more parameters must be entered in order to proceed with subsequent operations of the installation process, and wherein the subsequent operations cannot proceed until the one or more parameters have been entered.

12. The method as recited in claim 11, further comprising invoking a communication module to send the remote assistance request.

13. The method as recited in claim 11, wherein the installation process of the application is initiated by the installer at an installation site.

14. The method as recited in claim 11, wherein the application is an enterprise-level computer application.

\* \* \* \* \*